United States Patent
Hoshi et al.

(10) Patent No.: US 7,726,333 B2
(45) Date of Patent: Jun. 1, 2010

(54) FLUID CONTROLLER

(75) Inventors: George Hoshi, Tokyo (JP); Tsuneyuki Okabe, Tokyo (JP); Kenichi Goshima, Komaki (JP); Hideo Kobayashi, Komaki (JP); Akinori Nagaya, Komaki (JP); Michio Yamaji, Osaka (JP); Kazuhiro Yoshikawa, Osaka (JP); Yuji Kawano, Osaka (JP)

(73) Assignees: CKD Corporation, Komaki-shi (JP); Fujikin Incorporated, Osaka-shi (JP)

( * ) Notice: Subject to any disclaimer, the term of this patent is extended or adjusted under 35 U.S.C. 154(b) by 216 days.

(21) Appl. No.: 10/511,431

(22) PCT Filed: Apr. 23, 2002

(86) PCT No.: PCT/JP02/04009

§ 371 (c)(1),
(2), (4) Date: Jun. 14, 2005

(87) PCT Pub. No.: WO03/091634

PCT Pub. Date: Nov. 6, 2003

(65) Prior Publication Data

US 2005/0229972 A1     Oct. 20, 2005

(51) Int. Cl.
    *F16K 49/00*     (2006.01)
(52) U.S. Cl. ................. 137/341; 137/884
(58) Field of Classification Search ............ 137/341, 137/884; 118/724, 725; 248/222.12
    See application file for complete search history.

(56) References Cited

U.S. PATENT DOCUMENTS

| | | | | |
|---|---|---|---|---|
| 2,819,858 A | * | 1/1958 | Mittendorf | 248/74.2 |
| 3,733,459 A | * | 5/1973 | Lengstorf | 219/201 |
| 5,413,139 A | * | 5/1995 | Kusumoto et al. | 137/341 |
| 5,488,925 A | * | 2/1996 | Kumada | 118/715 |
| 5,771,919 A | * | 6/1998 | Itoi et al. | 137/454.6 |
| 5,983,933 A | * | 11/1999 | Ohmi et al. | 137/597 |
| 5,988,217 A | * | 11/1999 | Ohmi et al. | 137/614.2 |
| 6,014,498 A | * | 1/2000 | Ikeda et al. | 392/479 |
| 6,039,360 A | * | 3/2000 | Ohmi et al. | 285/61 |
| 6,060,691 A | * | 5/2000 | Minami et al. | 219/201 |
| 6,076,543 A | * | 6/2000 | Johnson | 137/15.17 |

(Continued)

FOREIGN PATENT DOCUMENTS

EP     0863348     9/1998

(Continued)

OTHER PUBLICATIONS

Supplementary European Search Report dated Mar. 18, 2008.

*Primary Examiner*—Stephen Hepperle
*Assistant Examiner*—Craig Price
(74) *Attorney, Agent, or Firm*—Kratz, Quintos & Hanson, LLP

(57) ABSTRACT

Each of lines A, B is provided on each of opposite sides thereof with a tape heater 11, and a space for positioning a tape heater holding clip 13 therein is provided in each of locations between adjacent fluid control devices. The tape heaters 11 are held from opposite sides thereof to the line by the clip 13. The lines A, B provided with the heaters are each mounted on a line support member 10 removably attached to a base member 1. The line support member 10 has a heater insertion bore 14 formed therein and extending longitudinally thereof. A sheath heater 12 is inserted into the bore 14.

12 Claims, 5 Drawing Sheets

U.S. PATENT DOCUMENTS

| | | | |
|---|---|---|---|
| 6,116,282 A * | 9/2000 | Yamaji et al. | 137/884 |
| 6,116,283 A * | 9/2000 | Yamaji et al. | 137/884 |
| 6,152,175 A * | 11/2000 | Itoh et al. | 137/602 |
| 6,273,139 B1 * | 8/2001 | Ohmi et al. | 137/884 |
| 6,382,238 B2 * | 5/2002 | Ishii et al. | 137/271 |
| 2001/0020488 A1 * | 9/2001 | Ishii et al. | 137/271 |
| 2002/0038672 A1 * | 4/2002 | Tsourides | 137/884 |
| 2003/0005959 A1 * | 1/2003 | Yamaji et al. | 137/341 |

FOREIGN PATENT DOCUMENTS

| | | |
|---|---|---|
| EP | 1273839 | 1/2003 |
| JP | 5-82245 | 4/1993 |
| JP | 7-74113 | 3/1995 |
| JP | 7-286720 | 10/1995 |
| JP | 11-294615 | 10/1999 |
| JP | 2000-230670 | 8/2000 |

* cited by examiner

FLUID CONTROLLER

TECHNICAL FIELD

The present invention relates to fluid control apparatus for use in semiconductor fabrication equipment, and more particularly to fluid control apparatus which require heating of a fluid.

As to the terms "front," "rear," "upper" and "lower" as used herein, the right-hand side of FIG. 1 will be referred to as "front," the left-hand side thereof as "rear," and the upper and lower sides of the same drawing as "upper" and "lower," respectively. The terms "left" and "right" are used for the apparatus as it is seen from the front rearward. However, the terms "front," "rear," "upper" and "lower" are used for the sake of convenience; the apparatus may be used with their front and rear sides reversed in position or with their upper and lower sides positioned as the left and right sides.

BACKGROUND ART

Fluid control apparatus for use in semiconductor fabrication equipment are made integrated by connecting a mass flow controller and shut-off valves without using tubes. Such apparatus are known which comprise a plurality of lines arranged in parallel on a base plate and having their inlets, as well as their outlets, oriented in the same direction, each of the lines comprising a plurality of fluid control devices arranged in an upper stage and a plurality of block coupling members arranged in a lower stage, the coupling members being removably attached to the base plate, the fluid control devices being removably mounted on the coupling members. The fluid control apparatus of the type described requires one or more lines equipped with a heating device depending on the use of the apparatus.

The conventional fluid control apparatus of the type described has the problem that it takes much time to assemble the components including the heating device. Another problem encountered is that since full consideration is not given to the additional provision of lines or modification of lines, there arises a need to remove all members as mounted on the base plate for replacement by a base plate having required members mounted thereon when the system is to be rebuilt, consequently entailing a prolonged period of shutdown and an increased number of construction steps in situ.

An object of the present invention is to provide a fluid control apparatus which is easy to assemble and highly amenable to the addition or modification of lines although having a heating device.

DISCLOSURE OF THE INVENTION

The present invention provides as a first aspect thereof a fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that at least one of the lines is provided on each of opposite sides thereof with a tape heater, a space for positioning a tape heater holding clip therein being provided in each of locations between adjacent fluid control devices, the tape heaters being held from opposite sides thereof to the line by the clip, the line provided with the heaters being mounted on a line support member removably attached to the base member.

In assembling the fluid control apparatus according to the first aspect of the invention in its entirety, lines are built by mounting coupling members and fluid control devices on line support members, arranging tape heaters on opposite sides of one or some of these lines which need to be heated and causing clips to hold the heaters to each line from opposite sides. The lines are then installed on a base member. Thus, the apparatus is easy to assemble. The line equipped with no heating device can be modified into a line having tape heaters merely by upwardly removing channel connecting means as required, removing the old line to be modified as mounted on the line support member, attaching the line support member of a heater-equipped line to the base member, and providing channel connecting means necessary for the modification. Thus, the line having heating device is available easily. Lines having the tape heaters can be added similarly with ease.

The present invention provides as a second aspect thereof a fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that each of the lines is mounted on a line support member removably attached to the base member, the line support member having a heater insertion bore formed therein and extending longitudinally thereof, a sheath heater being inserted into the bore.

When the fluid control apparatus embodying the second aspect of the invention is to be assembled in its entirety, the apparatus can be assembled easily by inserting sheath heaters into the heater bores of each of line support members, mounting coupling members and fluid control devices on these line support members to build lines, and installing the lines on a base member. Further a line equipped with no heating device can be modified into a line having sheath heaters merely by upwardly removing channel connecting means as required, removing the old line to be modified as mounted on the line support member, replacing the line support member by a line support member having sheath heaters, attaching the new support member to the base member, and providing channel connecting means necessary for the modification. Thus, the line having the heating device is available easily. Lines having sheath heaters can be added similarly with ease.

The apparatus of the first and second aspects of the invention can be used each singly, or in combination.

According to the first and second aspects of the invention, rails of various shapes, for example, are usable as line support members. In such a case, the line support member is a rail removably attached to the base member, and each of the coupling members is slidably mounted on the line support member. Preferably, each of the fluid control devices is mounted on at least two adjacent coupling members. Coupling members, fluid control devices and tape heaters can then be provided on the line support member by slidingly moving the coupling members along the path of the line support member to a required position, thereafter mounting the fluid control devices each on at least two adjacent coupling members and causing clips to hold the tape heaters. Thus, the line equipped with tape heaters can be assembled easily.

The base member may be in the form of a frame using rails (of nonmetallic material) for making line support members and using inlet-side rails, outlet-side rails and connectors interconnecting these rails. Lines can then be modified by upwardly removing channel connecting means as required, removing the oil line to be modified as mounted on the line support member, slidingly moving as required the support member for the line not to be modified, installing the line support member of the line to be substituted on the base member, further slidingly returning to a proper position the line support member for the line not to be modified, and finally installing channel connecting means required for the modification. Lines can be additionally provided similarly. Consequently, lines can be added or modified with greater ease. The nonmetallic material used for the rails of the base member permits the base member to produce a heat insulating effect, eliminating the need to provide an additional heat insulating layer.

Useful as fluid control devices are mass flow controllers, shut-off valves, check valves, regulators, filters, channel blocks, etc. The tape heater is held in contact with the side face of the body of the fluid control device provided at the lower portion of the device and having a channel. (In the case of the channel block, the heater is held to the entire side face thereof.) The tape heater may be held in contact with both the body of the fluid control device and the block coupling member.

BEST MODE OF CARRYING OUT THE INVENTION

Embodiments of the invention will be described below with reference to the drawings.

Figure 1:
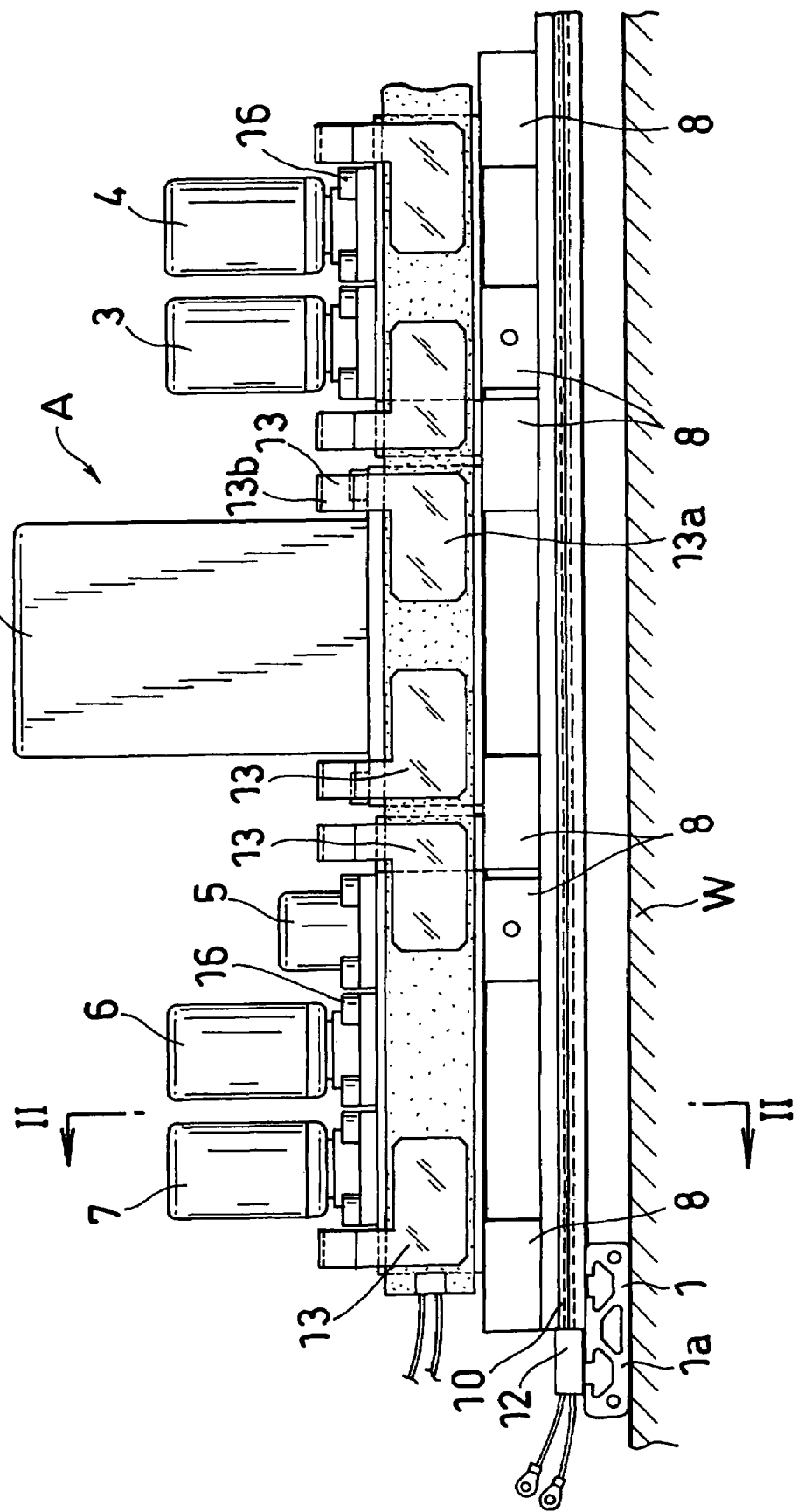
FIG. 1 is a side elevation showing a first embodiment of fluid control apparatus of the present invention.
Figure 2:
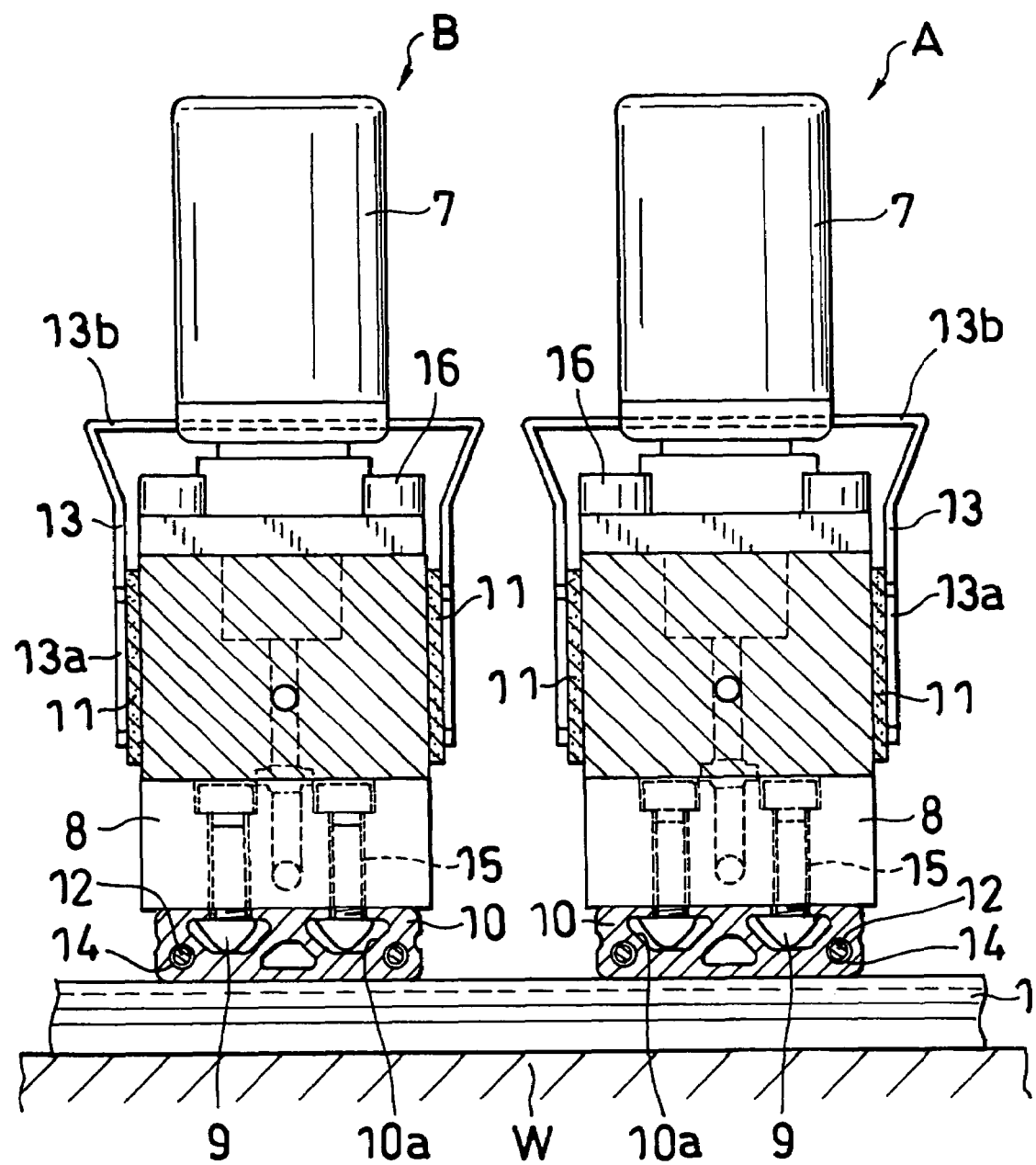
FIG. 2 is a view in section taken along the line II-II in FIG. 1.
Figure 3:
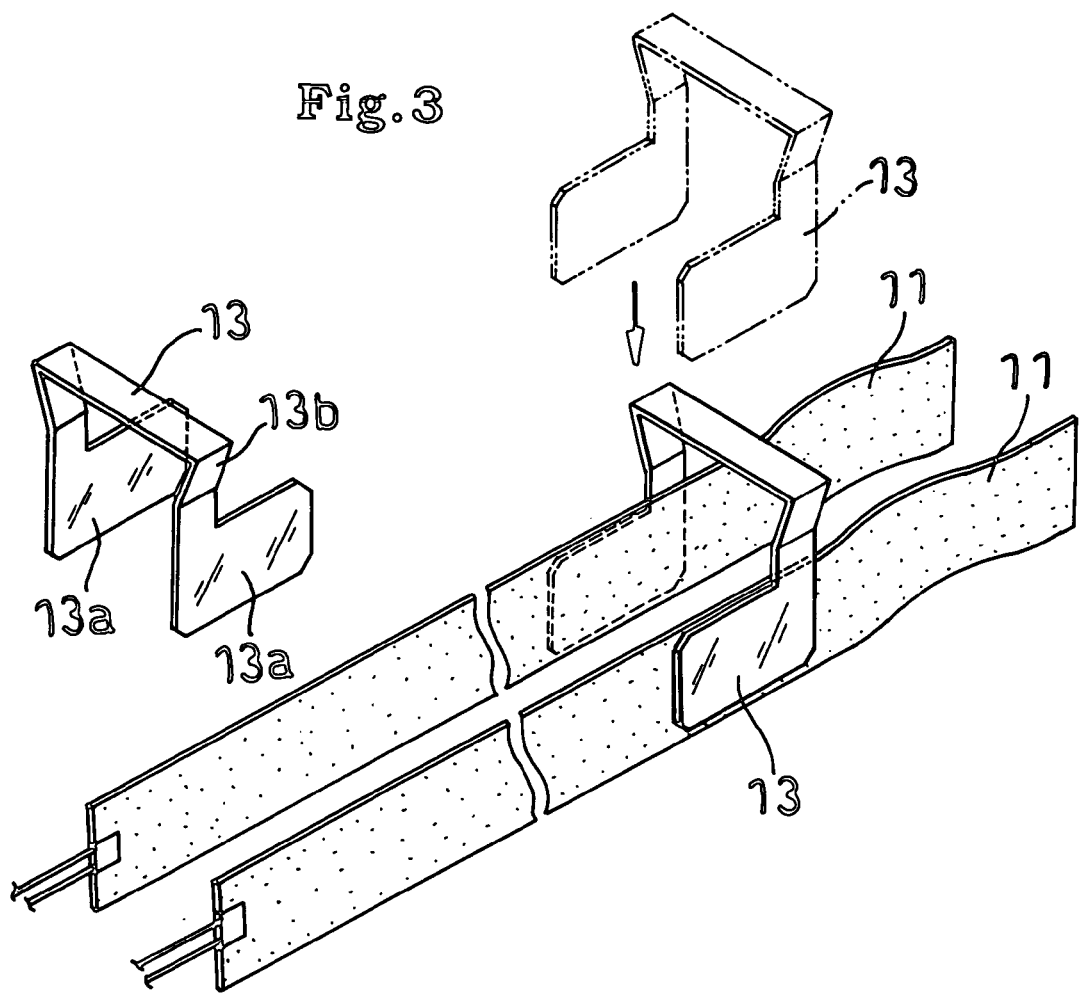
FIG. 3 is an enlarged exploded perspective view showing tape heaters providing a first heating device.
Figure 4:
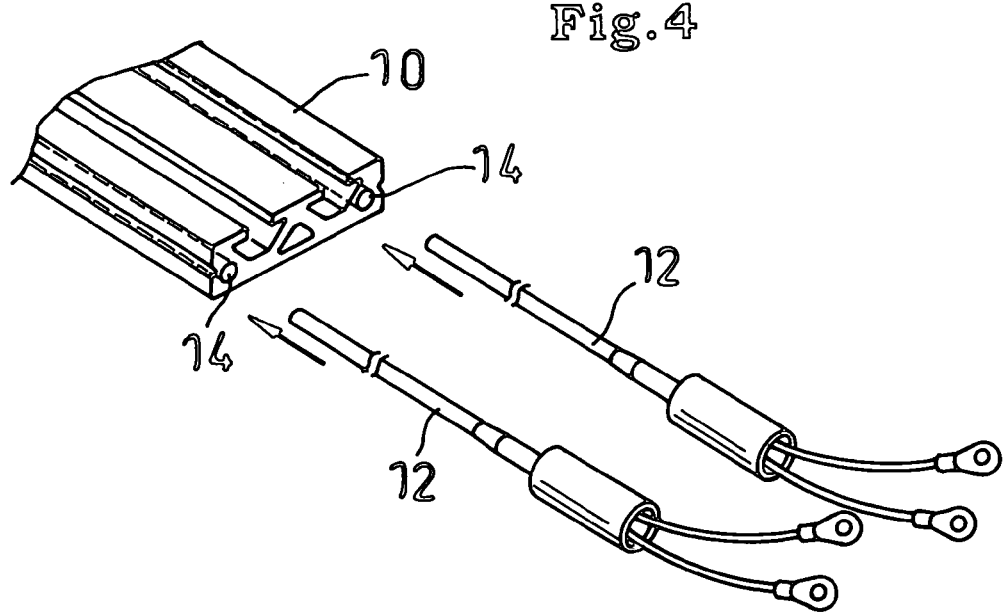
FIG. 4 is an enlarged exploded perspective view showing sheath heaters providing a second heating device.

FIGS. 1 to 4 show a first embodiments of the invention, i.e., a fluid control apparatus, comprising a plurality of lines A, B arranged in parallel on a base member 1, with their inlets, as well as their outlets, facing toward the same direction. (Two line A, B are shown in FIG. 2.) Each of these lines A, B (line A only shown in FIG. 1) comprises a plurality of fluid control devices 2, 3, 4, 5, 6, 7 arranged in an upper stage and a plurality of block coupling members 8 arranged in a lower stage. Each line A or B is mounted on a line support member 10. Each line A or B can be heated by a first heating device comprising tape heaters 11 shown in FIG. 3 and a second heating device comprising sheath heaters 12 shown in FIG. 4.

The fluid control devices of the line A shown in FIG. 1 are a mass flow controller 2; inlet-side first shut-off valve 3 and inlet-side second shut-off valve 4 which are provided in front (on the inlet side) of the mass flow controller 2; and check valve 5, outlet-side first shut-off valve 6 and outlet-side second shut-off valve 7 which are provided in the rear (on the outlet side) of the mass flow controller 2.

Each of the fluid control devices 2, 3, 4, 5, 6, 7 has a block body provided with a channel. Each pair of adjacent fluid control devices 2 to 7 are held in communication with each other by the block coupling 8 disposed therebelow and having a V-shaped channel. The coupling 8 has vertical internally threaded portions in its top. The fluid control devices 2, 3, 4, 5, 6, 7 are attached to the corresponding couplings 8 by driving screws 16, extending through the block bodies, into the respective vertical internally threaded portions.

The base member 1 is in the form of a frame comprising a plurality of lateral rails 1a extending in a direction orthogonal to the lines and connectors (not shown) connecting these rails.

The line support member 10 is a rail of synthetic resin. The block couplings 8 are slidably mounted on the line support member 10. The member 10 is made of an extrudate and has two grooves 10a formed in its interior and each in the form of an inverted trapezoid in cross section. Each of the grooves 10a has fitted therein a slide member 9 which is slidable along the groove. The block coupling 8 is fastened to the slide member 9 with screws 15 extending through the coupling 8 and each pressed at its lower end against the slide member 9. The block coupling 8 becomes slidable by loosening the screws 15, and is fixed in position to the line support member 10 by tightening up the screws 15.

The tape heaters 11 are arranged respectively on the left and right opposite sides of the block bodies of the fluid control devices 2, 3, 4, 5, 6, 7 and attached to the bodies by a plurality of clips 13 for pressing the heaters against the opposite sides at required locations. Each of the clips 13 is made from a thin metal plate, inverted U-shaped and adapted to hold the tape heaters 11 with a resilient force acting to reduce the spacing between the opposed walls 13a thereof. The clips 13 are arranged at two locations on each of the front and rear sides of the mass flow controller 2 and at each of the inlet and outlet of each line. The clip 13 has a top wall 13b having a shortened front-to-rear width. There is a space for positioning such top walls 13b on each of the front and rear sides of controller 2.

The sheath heaters 12 are embedded in the line support member 10. For this purpose, the support member 10 has two heater insertion bores 14 extending in the direction of the line. The heater insertion bores 14 are formed respectively in the left and right side portions of the member 10 each on the outer side of the bottom of the corresponding inverted trapezoidal groove 10a. The sheath heaters 12 are inserted into the respective bores 14 with their terminals exposed from the line support member 10.

The lateral rail 1a of the base member 1 is the same as the line support member 10 except that no heater insertion bore 14 is formed therein. The line support member 10 is attached to the lateral rail 1a in the same manner as the coupling member 8 as mounted on the support member, whereby the line support member 10 is made slidable in a direction (leftward or rightward direction) orthogonal to the line (in the forward or rearward direction).

In assembling the fluid control apparatus in its entirety, or modifying or additionally providing lines, line support members 10 each having the components 2, 3, 4, 5, 6, 7, 8, 11, 13 mounted thereon are prepared first. These line support members can then be assembled as units, or such line support members are removable as units. This ensures facilitated work. Since the block couplings 8 are slidable along the line support member 10, the components 2, 3, 4, 5, 6, 7, 8 can be installed on the line support member 10 also easily.

Figure 5:
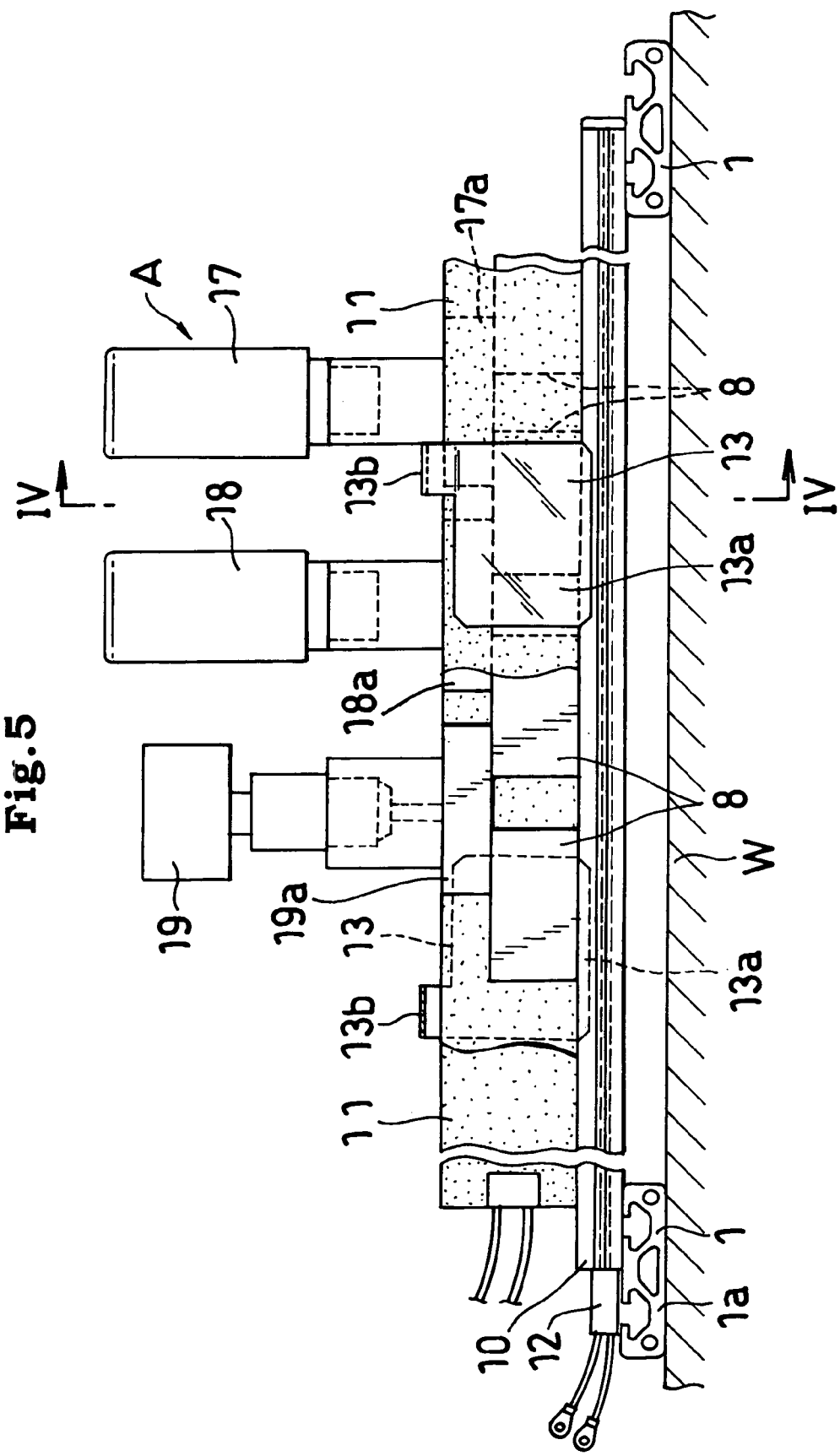
FIG. 5 is a side elevation showing a second embodiment of fluid control apparatus of the present invention.
Figure 6:
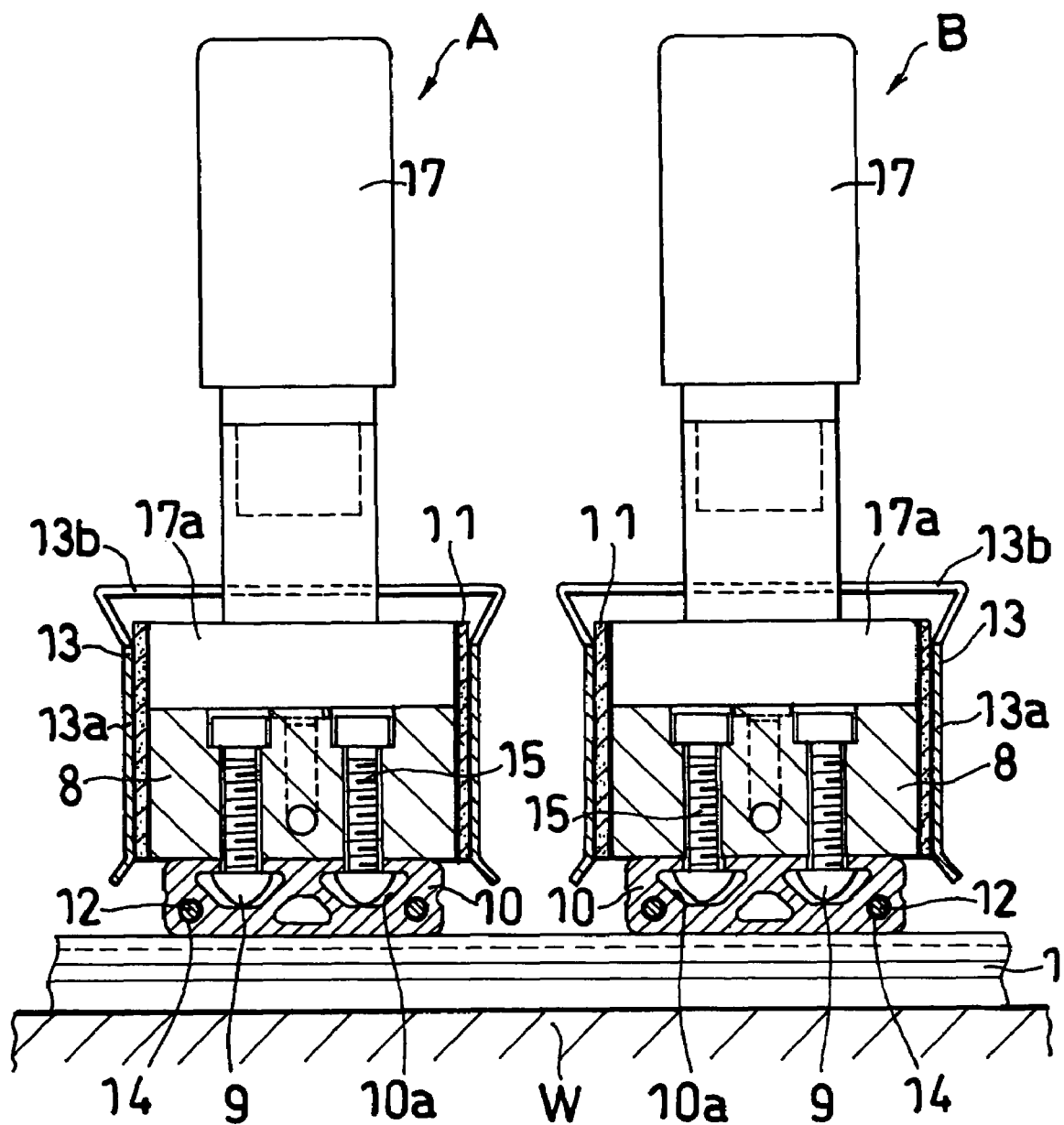
FIG. 6 is a view in section taken along the line VI-VI in FIG. 5.

FIGS. 5 and 6 show a second embodiment of fluid control apparatus according to the invention. As shown in these drawings, fluid control devices 17, 18, 19 have bodies 17a, 18a, 19a which are smaller in vertical height than the bodies of the fluid control devices 3, 4, 5, 6, 7 of the first embodiment. Tape heaters 11 are provided in contact with not only the device bodies 17a, 18a, 19a but also the side faces of coupling members 8. Clips 13 are retained not only by the device bodies 17a, 18a, 19a but also by the coupling members 8. With the exception of these features, the second embodiment is the same as the first, and throughout the drawings, like parts or components are designated by like reference numerals.

Like the first embodiment, the second embodiment also ensures facilitated work in assembling the apparatus in its entirety or in modifying or adding lines. The second embodiment is useful in the case where heating is highly necessary. The tape heater 11 and the sheath heater 12 need not always be used in combination; either one of them can be used in accordance with the need for heating.

INDUSTRIAL APPLICABILITY

The apparatus of the invention is suitable for use as a fluid control apparatus in semiconductor fabrication equipment when the fluid to be used for treating semiconductors needs to be supplied as heated.

The invention claimed is:

1. A fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that at least one of the lines is provided on each of opposite sides thereof with a tape heater, a tape heater holding clip being of an inverted U-shape with flat opposed walls and being removably attached to the tape heater, a space for positioning the tape heater holding clip therein being provided in each of locations between adjacent fluid control devices, the tape heaters being held from opposite sides thereof to block bodies of the fluid control devices with a resilient force acting to reduce the spacing between the opposed walls of the clip, the line provided with the heaters being mounted on a line support member removably attached to the base member;
the base member in the form of a frame comprising a plurality of lateral rails the main axis of which extends in a direction orthogonal to the lines.

2. A fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that each of the lines is mounted on a line support member removably attached to the base member, the line support member having a heater insertion bore formed therein and extending longitudinally thereof, a sheath heater being inserted into the bore without insulating material, wherein each of the coupling members is slidably mounted on the line support member, and each of the fluid control devices is mounted on at least two adjacent coupling members;
the base member in the form of a frame comprising a plurality of lateral rails the main axis of which extends in a direction orthogonal to the lines.

3. A fluid control apparatus according to claim 1 wherein the line support member has a heater insertion bore formed therein and extending longitudinally thereof, and a sheath heater is inserted into the bore.

4. A fluid control apparatus according to claim 1 or claim 3 wherein each of the coupling members is slidably mounted on the line support member, and each of the fluid control devices is mounted on at least two adjacent coupling members.

5. A fluid control apparatus according to any one of claim 1 to 3 which is characterized in that the lateral rails are made of a nonmetallic material, the line support member of each of the lines being mounted on the base member slidably in a lateral direction.

6. A fluid control apparatus according to claim 1 wherein the tape heater is held in contact with bodies of the fluid control devices and with the block coupling members.

7. A fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that each of the lines is mounted on a line support member removably attached to the base member, the line support member having a heater insertion bore formed therein and extending longitudinally thereof, a sheath heater being inserted into the bore, wherein the base member has a plurality of lateral rails made of a nonmetallic material and the main axis of which extends in a direction orthogonal to the lines, the line support member of each of the lines being mounted on the base member slidably in a lateral direction;
wherein the clip is made from a thin metal plate of inverted U-shape, the clip having a top wall having a shortened front-to-rear width so that there is a space for positioning the top wall on each of the front and rear sides of the controller.

8. A fluid control apparatus comprising a plurality of lines arranged in parallel on a base member and having inlets, as well as outlets, facing toward the same direction, each of the lines comprising a plurality of fluid control devices arranged in an upper stage and a plurality of block coupling members arranged in a lower stage, the fluid control apparatus being characterized in that at least one of the lines is provided on each of opposite sides thereof with a tape heater, a tape heater holding clip being of an inverted U-shape with flat opposed walls and being removably attached to the tape heater, a space for positioning the tape heater holding clip therein being provided in each of locations between adjacent fluid control devices, the tape heaters being held from opposite sides thereof to block bodies of the fluid control devices with a resilient force acting to reduce the spacing between the opposed walls of the clip, the line provided with the heaters being mounted on a line support member removably attached to the base member;
wherein the clip is made from a thin metal plate of inverted U-shape, the clip having a top wall having a shortened front-to-rear width so that there is a space for positioning the top wall on each of the front and rear sides of the controller.

9. A fluid control apparatus according to claim 8 wherein the line support member has a heater insertion bore formed therein and extending longitudinally thereof, and a sheath heater is inserted into the bore.

10. A fluid control apparatus according to claim 8 or claim 9 wherein each of the coupling members is slidably mounted on the line support member, and each of the fluid control devices is mounted on at least two adjacent coupling members.

11. A fluid control apparatus according to any one of claim 8 or 9 which is characterized in that the base member has a plurality of lateral rails made of a nonmetallic material and extending in a direction orthogonal to the lines, the line support member of each of the lines being mounted on the base member slidably in a lateral direction.

12. A fluid control apparatus according to claim 8 wherein the tape heater is held in contact with bodies of the fluid control devices and with the block coupling members.

* * * * *